United States Patent
Kasuya et al.

[11] Patent Number: 5,890,988
[45] Date of Patent: Apr. 6, 1999

[54] AUTOMATIC TRANSMISSION FOR VEHICLE WITH REVERSE GEAR BRAKE

[75] Inventors: Satoru Kasuya; Nobutada Sugiura; Kazumasa Tsukamoto; Masahiro Hayabuchi; Masaaki Nishida, all of Anjo, Japan

[73] Assignee: Aisin AW Co., Ltd., Anjo, Japan

[21] Appl. No.: 771,136

[22] Filed: Dec. 20, 1996

[30] Foreign Application Priority Data

May 31, 1996 [JP] Japan .................................... 8-159285
Sep. 18, 1996 [JP] Japan .................................... 8-266594

[51] Int. Cl.⁶ ..................................................... F16H 3/44
[52] U.S. Cl. .......................... 475/282; 475/317; 475/298; 192/4 C; 192/69.9
[58] Field of Search ................................ 192/4 C, 69.9; 188/31, 69; 475/269, 249, 282–317

[56] References Cited

U.S. PATENT DOCUMENTS

| | | | |
|---|---|---|---|
| 1,977,588 | 10/1934 | Matson .................................... | 192/4 A |
| 2,588,161 | 3/1952 | Probst .................................... | 192/69.9 |
| 3,425,527 | 2/1969 | Wolf ........................................ | 192/69.9 |
| 3,886,816 | 6/1975 | De Feo et al. . | |
| 4,019,406 | 4/1977 | Herr . | |
| 4,074,591 | 2/1978 | Dick ........................................ | 475/249 |
| 4,370,896 | 2/1983 | Markfeld et al. ........................ | 192/4 C |
| 5,219,054 | 6/1993 | Teraoka .................................. | 192/69.9 |
| 5,447,478 | 9/1995 | Braun ..................................... | 475/282 |
| 5,520,272 | 5/1996 | Ewer et al. ......................... | 192/69.9 X |
| 5,651,435 | 7/1997 | Perosky et al. ......................... | 192/4 C |

FOREIGN PATENT DOCUMENTS

| | | |
|---|---|---|
| 0 365 713 | 5/1990 | European Pat. Off. . |
| 0 521 270 | 1/1993 | European Pat. Off. . |
| 24 06 315 | 8/1975 | Germany . |
| A-6-323377 | 11/1994 | Japan . |
| 8-054059 | 2/1996 | Japan . |
| 405664 | 2/1934 | United Kingdom . |
| 1 468 492 | 3/1977 | United Kingdom . |
| 2 102 515 | 2/1983 | United Kingdom . |

Primary Examiner—Khoi Q. Ta
Attorney, Agent, or Firm—Oliff & Berridge, PLC

[57] ABSTRACT

An automatic transmission for a vehicle with a reverse gear brake that includes a case. A predetermined rotational element, having gear teeth and an axis, is disposed within the case. The predetermined rotational element only operates as a rotational element when achieving a reverse gear mode. A brake has a gear member. The gear member is attached to the case so that it cannot rotate relative to the case, but is movable along the axis of the predetermined rotational element so that it can be engaged and disengaged with the teeth of the predetermined rotational element. The predetermined rotational element is fixed to the case so that it cannot rotate relative to the case when the gear teeth engage the gear member.

15 Claims, 7 Drawing Sheets

|  | C-1 | C-2 | B-1 | B-2 | B-3 | B-R |
|---|---|---|---|---|---|---|
| P |  |  |  |  |  |  |
| REV | O |  |  |  |  | O |
| N |  |  |  |  |  |  |
| 1ST | O |  |  |  | O |  |
| 2ND |  | O |  |  | O |  |
| 3RD | O | O |  |  |  |  |
| 4TH |  | O | O |  |  |  |
| 5TH |  | O |  | O |  |  |

| | B-1 | B-2 | B-R | C-1 | C-2 | C-3 | F-1 | F-2 |
|---|---|---|---|---|---|---|---|---|
| 1ST | O | O | | | | O | O | O |
| 2ND | | O | | O | | O | | O |
| 3RD | | O | | O | O | | | |
| 4TH | | | | O | O | O | | |
| 5TH | O | | | | O | O | O | |
| N | O | | | | | O | | |
| R 1 | O | | O | | | O | O | |
| R 2 | | | O | O | | O | | |

AUTOMATIC TRANSMISSION FOR VEHICLE WITH REVERSE GEAR BRAKE

BACKGROUND OF THE INVENTION

1. Field of the Invention

This invention relates to an automatic transmission for a vehicle, and more particularly, to an automatic transmission for a vehicle which uses a gear brake structure to fix a predetermined rotational element to a transmission case to achieve a reverse gear mode.

2. Description of Related Art

Generally, in an automatic transmission for a vehicle, a brake mechanism means for fixing a specific rotational element of a transmission mechanism to achieve a reverse gear mode includes a wet multiple-disk type frictional engagement element. Such a reverse gear mode brake mechanism has a relatively large reverse gear ratio, and the transmitted torque is greatly amplified in response to the reverse gear ratio. This requires the brake mechanism, which receives the inverse force (reaction) of the torque, to have a high torque-absorption capacity. Accordingly, the number of disks used in the frictional engagement element becomes large.

When the wet multiple-disk type frictional engagement element is out of engagement, only a very slight gap separates the frictional material from the separator plate to cut off the torque transmission. The gap is very small so that the frictional material and the separator plate can return to the engaging position quickly when required. For this reason, even in the released state, drag torque inevitably is caused due to the induced rotation of the lubricating oil disposed in this gap. Dragging is especially increased, which reduces power-transmissive efficiency, when many disks are used to achieve a high torque-absorption capacity.

Japanese Laid-open Patent Application 6-323377 discloses a structure wherein a specific rotational element is fixed to a case by a gear type clutch mechanism, i.e., a dog clutch, to achieve the reverse mode. The dog clutch and a frictional clutch are positioned in series. The rotational element, which rotates in the torque-transmissive state, is stopped by the frictional clutch through frictional engagement, with the dog clutch still being out of engagement, thereby eliminating dragging.

This apparatus includes a typical transmission mechanism, in which the rotational element is used to achieve both the reverse and forward modes. Thus, the dog clutch and the frictional clutch must be arranged in series. In such a structure, the frictional clutch requires the same torque capacity as a conventional frictional brake. If this combination is utilized as a brake mechanism to achieve the reverse mode, it will need a dog clutch, in addition to the frictional clutch which corresponds to a conventional frictional brake. These additional components prevent the apparatus from being compact.

Thus, the industry lacks an automatic transmission for a vehicle, in which a gear brake is used as a brake mechanism to achieve the reverse mode, in order to substantially eliminate dragging, while allowing the apparatus to be compact.

However, an apparatus wherein the reverse mode brake mechanism is made as a gear brake has the problem that when a specific rotational element is stopped for achieving the reverse mode, that rotational element may still tend to rotate due to the slight rotation induced between rotational elements. This rotation tends to cause gear noise. Therefore, the industry also lacks an apparatus to prevent gear noise due to induced rotation, while allowing the apparatus to remain compact.

Generally, an automatic transmission includes a plurality of engaging elements. The engaging elements are typically driven by a hydraulic servo. Therefore, it is desirable for the gear type brake mechanism to be driven by a hydraulic servo in the same manner as the other engaging elements. The industry lacks a gear brake structure, in which a conventional hydraulic servo is used as the frictional engagement element.

The industry also lacks a compact structure that uses a conventional hydraulic servo, and which prevents gear noise due to the induced rotation described above by operating in the same manner as conventional frictional engagement elements.

Generally, the specific rotational element for achieving the reverse mode in the automatic transmission is one element of a planetary gear. If the rotational element is stopped by a gear brake, the center aligning action of this rotational element may be impeded, in spite of the fact that the optimum centering of the rotational element according to the gearing state with the other gears under the power transmission is essential. Therefore, the industry lacks a gear brake structure for the reverse mode, which maintains the centering function of the predetermined rotational element by modifying the shape of the gear part.

The industry also lacks an apparatus for bringing the frictional engagement element into the engaging position to prevent gear noise prior to bringing the gear member into the engaging position for fixing the predetermined rotational element.

The industry also lacks an apparatus to achieve sequential movement of the frictional engagement element for preventing gear noise, and the gear member for fixing the rotational element, by using a single hydraulic servo.

SUMMARY OF THE INVENTION

It is a first object of the invention to provide an automatic transmission for a vehicle, in which a gear brake is used as a brake mechanism to achieve the reverse mode, in order to substantially eliminate dragging, while allowing the apparatus to be compact.

It is a second object of the invention to provide an apparatus to prevent gear noise due to induced rotation, while allowing the apparatus to be compact.

It is a third object of the invention to provide a gear brake structure, in which a conventional hydraulic servo is used as the frictional engagement element.

It is a fourth object of the invention to provide a compact structure that uses a conventional hydraulic servo, and which prevents gear noise by operating in the same manner as conventional frictional engagement elements.

It is a fifth object of the invention to provide a gear brake structure for the reverse mode, which maintains the centering function of the predetermined rotational element by modifying the shape of the gear part.

It is a sixth object of the invention to provide an apparatus that brings the frictional engagement element into the engaging position to prevent gear noise prior to bringing the gear member into the engaging position to fix the predetermined rotational element.

It is a seventh object of the invention to achieve sequential movement of the frictional engagement element for preventing gear noise, and the gear member for fixing the rotational element, by using a single hydraulic servo.

In order to achieve the first object, the invention provides an automatic transmission for a vehicle, with a reverse gear brake, that includes a predetermined rotational element disposed in the transmission mechanism. The predetermined rotational element constitutes a reactional element for achieving at least the reverse gear mode. A brake mechanism fixes the predetermined rotational element to a case in a meshed manner. The transmission mechanism only uses the predetermined rotational element as the reactional element to achieve the reverse gear mode. The predetermined rotational element has gear teeth. The brake mechanism includes a gear member. The gear member is retained on the case so that it cannot rotate. However, the gear member is movable in the axial direction, so that it can be engaged and disengaged with the gear teeth of the predetermined rotational element. The predetermined rotational element is fixed to the case through the engagement of the gear teeth with the gear member of the brake mechanism so that it cannot rotate.

To achieve the second object, the brake mechanism includes a frictional engagement member. The frictional engagement member is retained on the case so that it cannot rotate. The frictional engagement member is movable in the axial direction, and frictionally contacts the predetermined rotational element. The frictional engagement member is disposed between the predetermined rotational element and case so that it is parallel to the gear member. The frictional engagement member moves in conjunction with the movement of the gear member to fix the predetermined rotational element to the case by frictionally engaging the predetermined rotational element.

To achieve the third object, the brake mechanism includes a hydraulic servo which has a piston for bringing the gear member into position for gear engagement with the predetermined rotational element. A return spring releases the gear member from gear engagement. The gear member is formed separately from the piston of the hydraulic servo, and has teeth that engage the gear teeth of the predetermined rotational element. A coupling part is fixed to the case so that it cannot rotate. The coupling part is movable in the axial direction, while allowing for swing of the center axis. The gear member moves in response to the movement of the piston of the hydraulic servo against the pressing force of the return spring.

To achieve the fourth object, the brake mechanism includes a hydraulic servo. The hydraulic servo has a piston for bringing the frictional engagement member and the gear member into frictional and gear engagement, respectively, with the predetermined rotational element. A return spring releases the gear member from gear engagement. The gear member is formed separately from the piston of the hydraulic servo, and has teeth that engage the gear teeth of the predetermined rotational element. A coupling part is fixed to the case so that it cannot rotate. The coupling part is movable in the axial direction, while allowing for swing of the center axis. The frictional engagement member is formed separately from the piston of the hydraulic servo, and has an engaging part that frictionally engages the predetermined rotational element. The frictional engagement member also has a coupling part fixed to the case so that it cannot rotate. The coupling part of the frictional engagement member is movable in the axial direction, while allowing the swing of the center axis. The frictional engagement member moves in response to the movement of the piston of the hydraulic servo against the pressing force of the return spring.

To achieve the fifth object, gear grooves between the gear teeth of the predetermined rotational element, and gear grooves between the gear teeth of the gear member which are engaged with the gear teeth of the rotational element, have a rectangular cross-section with parallel side faces.

To achieve the sixth object, the frictional engagement member frictionally engages the predetermined rotational element before the gear member initiates gear engagement with the predetermined rotational element.

To achieve the seventh object, the frictional engagement member includes a frictional surface for frictionally engaging the predetermined rotational element. The hydraulic servo has a load transmissive spring disposed between the frictional engagement member and the piston. The gear member contacts the piston through the pressing force of the return spring. The frictional engagement member contacts the gear member through the pressing force of the load transmissive spring. The frictional engagement member receives the pressing force caused by the movement of the piston, through the load transmissive spring, and frictionally engages the predetermined rotational element. Further movement of the piston moves the gear member to engage the predetermined rotational element in the meshed manner.

In accordance with the invention, the rotation of the predetermined rotational element is stopped only when achieving the reverse gear mode. The rotation is stopped by direct engagement with the gear member fixed to the case, without the use of a frictional engagement member, such as a multiple-disc clutch. This structure does not require engagement in the torque-transmissive state, unlike the conventional structure in which the engagement element is used for both the reverse gear mode and the forward gear mode. Accordingly, dragging, which may be caused when the reverse mode brake is released, is substantially eliminated, while allowing the apparatus to be compact. In the overall structure of the transmission mechanism, driving loss due to dragging of the engaging element used frequently to achieve forward gear modes is greatly reduced.

In accordance with another aspect of the invention, the predetermined rotational element is fixed to the case by a frictional engagement member, even when the predetermined rotational element is still in rotation due to slight dragging between rotational elements. The rotation of the predetermined rotational element is stopped by the frictional engagement member prior to the gear engagement with the gear member to prevent gear noise. Moreover, the predetermined rotational element is fixed to the case through both gear engagement with the gear member and frictional engagement with the frictional engagement member, in parallel. The gear member transmits a large amount of stop torque. This allows the capacity of the frictional engagement member to be reduced. Consequently, gear noise due to dragging typically caused by a gear brake structure is prevented, while allowing the apparatus to be compact.

In accordance with another aspect of the invention, the gear member and the piston of the hydraulic servo are formed separately. The gear member is coupled to the case, with a gap therebetween in a radial direction. This prevents the vibration of the center of the gear member from adversely affecting the piston. The sealing ability of the hydraulic servo is ensured. Other problems resulting from vibration of the center are also eliminated. Therefore, the same hydraulic servo structure as is used for operating conventional frictional engagement members can be used.

In accordance with another aspect of the invention, the center vibration of the frictional engagement member is also prevented from affecting the piston. Therefore, the same hydraulic servo structure as is used for operating conventional frictional engagement members can be used. Gear noise is also prevented.

In accordance with another aspect of the invention, the predetermined rotational element is engaged with the gear member of the brake, via rectangular gear teeth and rectangular gear grooves, to stop the rotation of the predetermined rotational element, while allowing center aligning action based on the torque transmission from other rotational elements. This can prevent gear noise caused by compulsive gear mesh of rotational elements in the planetary gear set.

In accordance with another aspect of the invention, the predetermined rotational element engages the gear member of the brake after the predetermined rotational element engages the frictional engagement element, thereby preventing gear noise.

In accordance with another aspect of the invention, the movement of the piston causes the frictional engagement member to be pressed into frictional engagement with the predetermined rotational element, via the load transmissive spring, to stop the rotation thereof. Further movement of the piston causes the gear member to move into gear engagement with the predetermined rotational element. These sequential actions are performed by a single hydraulic servo, by simply adding a load transmission spring.

BRIEF DESCRIPTION OF THE DRAWINGS

Further objects, details and advantages of the invention will be apparent from the following detailed description, when read in conjunction with the drawings.

DETAILED DESCRIPTION OF PREFERRED EMBODIMENTS

Figures 4, 5:
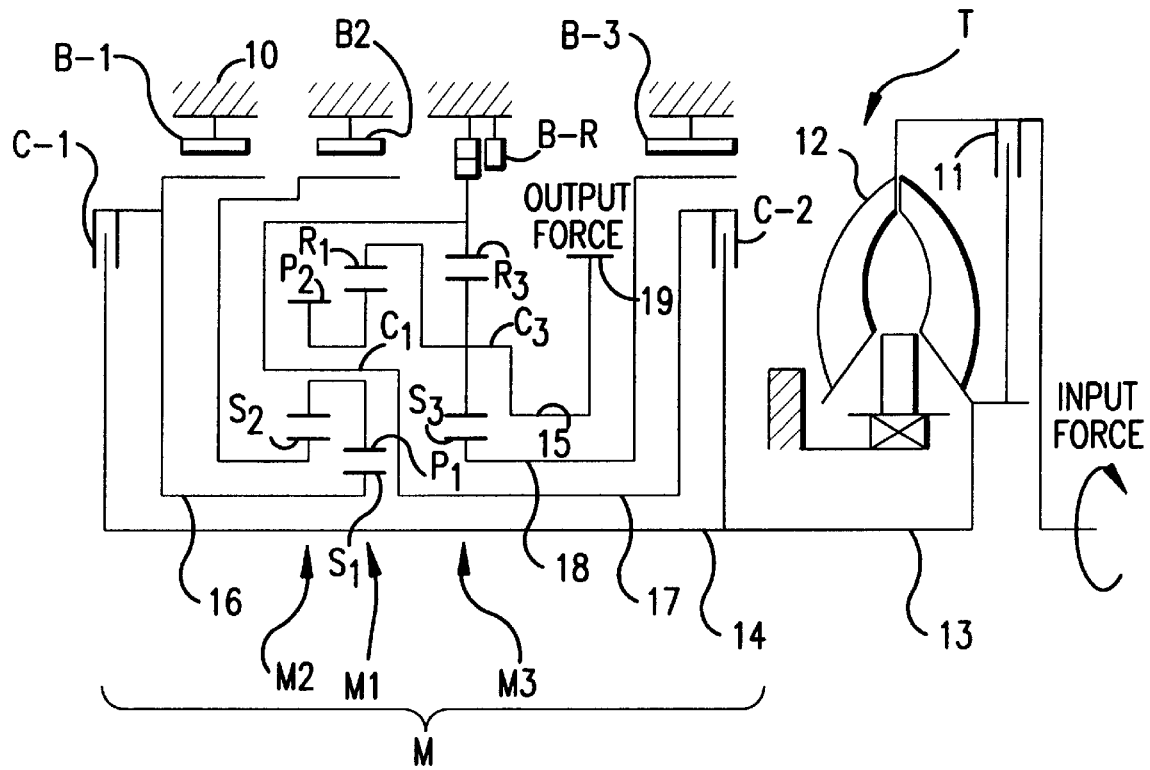
FIG. 4 is a diagram showing the overall structure of a transmission mechanism according to the first embodiment of the invention.
FIG. 5 is a table showing the states of engagement and disengagement of the clutches and brakes of the transmission mechanism.

FIG. 4 shows a first embodiment of an automatic transmission with a gear brake for achieving the reverse gear mode. The automatic transmission T includes a torque converter 12 with a lock-up clutch 11 coupled with an engine of an automobile. An automatic transmission mechanism M having three planetary gear sets M1, M2 and M3 changes the output from the torque converter 12 so as to correspond to five forward speed modes and one reverse mode.

In the automatic transmission T, pinion gears $P_1$ and $P_2$ of the planetary gear sets M1 and M2 of the transmission mechanism M are directly coupled with each other. Pinion gears $P_1$ and $P_2$ have different diameters. Ring gears $R_1$ and $R_3$ of the planetary gear sets M1 and M3 are connected to carriers $C_3$ and $C_1$, respectively. Sun gear $S_1$ and carrier $C_1$ of the planetary gear set M1 operate as input elements. Sun gear $S_1$ and carrier $C_1$ are connected through clutches C-1 and C-2 to the input shaft 14 coupled with the turbine shaft 13 of the torque converter 12. Ring gear $R_1$ is engaged to carrier $C_3$. Ring gear $R_1$ and carrier $C_3$ are coupled through the output shaft 15 to the output gear 19 as an output element. Sun gear $S_1$ of the planetary gear set M1 can be fixed to the transmission case 10 through brake B-1. Sun gear $S_2$ of the planetary gear set M2 can be fixed to the transmission case 10 through the brake B-2. Sun gear $S_3$ of the planetary gear set M3 can be fixed to the transmission case 10 through brake B-3. Ring gear $R_3$, connected with carrier $C_1$, can be fixed to the transmission case 10 through brake B-R.

More particularly, sun gear $S_1$ is coupled with the clutch C-1 through the sun gear shaft 16. Sun gear shaft 16 is fitted to the outer surface of the input shaft 14. Carrier $C_1$ is coupled with the clutch C-2 through the carrier shaft 17. Carrier shaft 17 is fitted to the outer surface of the input shaft 14. Sun gear $S_3$ is coupled with the brake B-3 through the sun gear shaft 18. Sun gear shaft 18 is fitted to the outer surface of the carrier shaft 17. All the brakes, except for brake B-R, are band brakes. Brake B-R is a gear brake. The hydraulic servo for the brakes is not shown. Output gear 19, which operates as an output element, is coupled with the differential device via the counter gear.

In the automatic transmission T, oil under pressure is supplied to each of the hydraulic servomechanisms corresponding to the clutches and brakes. FIG. 5 shows that each gear mode includes connecting a specific combination of clutches and brakes (indicated by a circular symbol in the table). Thus, disconnecting specified clutches and brakes (indicated as a blank space in the table), via the electronic control system and hydraulic control system (not shown), achieves a desired gear mode. More particularly, the first speed mode (1ST) is achieved by bringing clutch C-1 and brake B-3 into engaging positions. In this state, the rotation of the input shaft 14 is transmitted to the sun gear $S_1$ via clutch C-1. The sun gear $S_3$ is fixed through the engagement of brake B-3. Thus, the rotation is output to the output gear 19, as the most decelerated rotation of carrier $C_3$.

The second speed mode (2ND) is achieved by bringing clutch C-2 and brake B-3 into their engaging positions. The input to the carrier shaft 17, through clutch C-2, is transmitted via carrier $C_1$ to the ring gear $R_3$. The rotation is output to the output gear 19, as the differential rotation of carrier $C_3$ under the influence of the inverse force, i.e., reaction, of the sun gear $S_3$ fixed through the engagement of brake B-3.

The third speed mode (3RD) is achieved by bringing clutches C-1 and C-2 into their engaging positions. In this state, all the gears in planetary gear set M1 rotate in a body. The rotation of the input shaft 14 is output to the output shaft 19 directly, as it is, in the form of a rotation of carrier $C_3$.

The fourth and higher speed modes are regarded as an over-drive mode. The fourth speed mode (4TH) is achieved by bringing clutch C-2, and brake B-1 for stopping the rotation of sun gear $S_1$, into their engaging positions. In this state, the rotation of the input shaft 14 is transmitted from carrier $C_3$ to the output shaft 19, as the increased rotation of ring gear $R_1$, which contains the rotational component of pinion gear $P_1$ rotating on its own axis, in addition to the rotational component of the carrier $C_1$.

The fifth speed mode (5TH) is achieved by bringing clutch C-2 and brake B-2 into their engaging positions. The rotation of the input shaft 14 is transmitted from carrier $C_3$ to the output shaft 19, as the further increased rotation of ring gear $R_1$, which contains the rotational component of pinion gear $P_2$ having a smaller diameter and rotating on its axis. This rotation also receives the inverse force of sun gear $S_2$ with a larger diameter, as compared with the fourth speed mode (4TH), in addition to the rotational component of carrier $C_1$.

The reverse gear mode (REV), as it pertains to the invention, is achieved by bringing clutch C-1 and brake B-R into their engaging positions. In this state, the input is transmitted through clutch C-1 to the sun gear $S_1$, while the rotation of the carrier $C_1$ is stopped through the engagement of brake B-R. Consequently, a slow, reversed rotation of ring gear $R_1$, due to the rotation of pinion gear $P_1$ on its own axis, is output from the output gear 19 through the carrier $C_3$.

Figure 1:
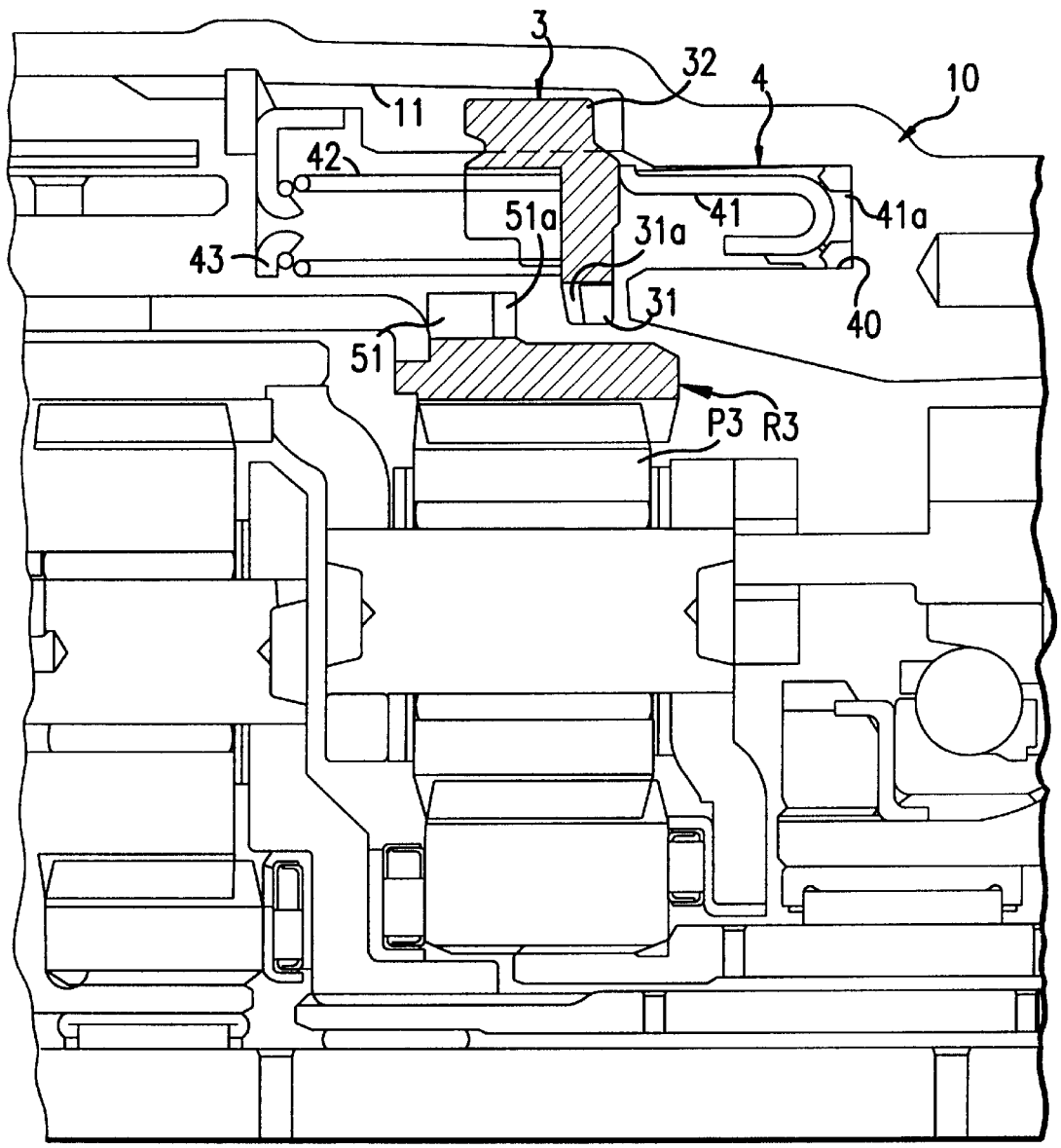
FIG. 1 is a partial cross-sectional view showing a gear brake according to a first embodiment of the invention.
Figure 2:
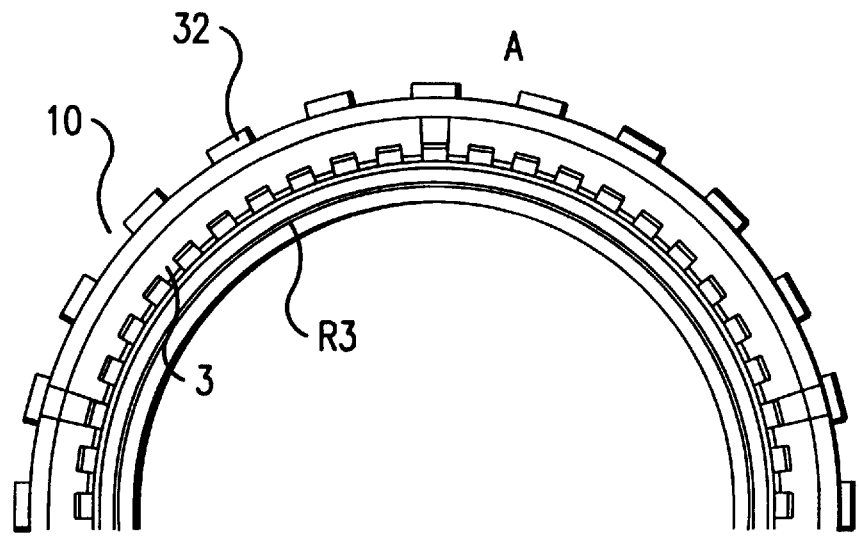
FIG. 2 is a front elevational view of the gear brake of FIG. 1, showing a gear engaging state.
Figure 3:
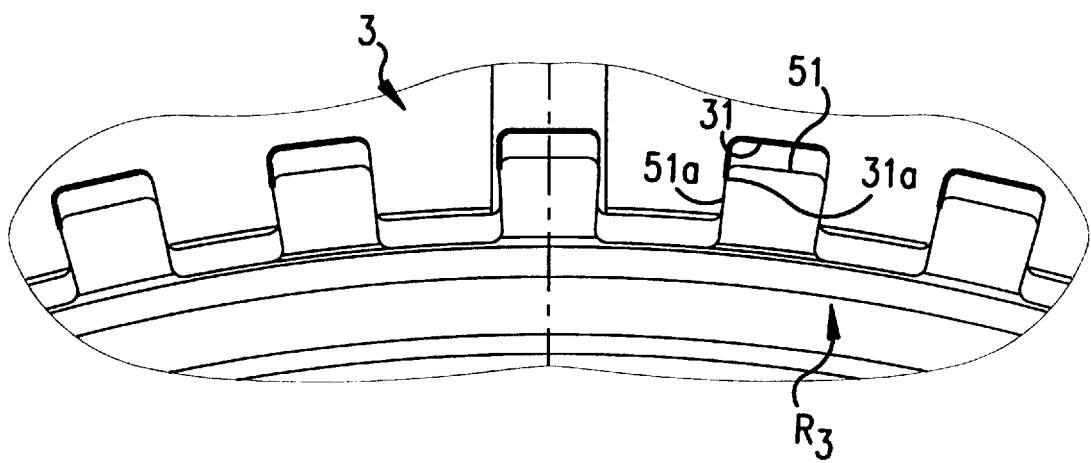
FIG. 3 is an enlarged view of the area A of FIG. 2.

In the automatic transmission T of the invention, the rotation of the predetermined rotational element, which is stopped through gear engagement to achieve the reverse mode, is represented by ring gear $R_3$. The reverse brake for stopping the predetermined rotational element is represented by brake B-R. As shown in FIGS. 1–3, the reverse brake is a gear brake which engages ring gear $R_3$ to fix the ring gear $R_3$ against the case 10.

FIG. 1 shows a gear brake that includes a gear member 3 and a hydraulic servo 4 for driving the gear member 3. Gear member 3 has an annular shape, and has spline teeth 32 disposed along its outer circumference for coupling to the case 10. The spline teeth 32 have a rectangular cross-section, with parallel side surfaces, as shown in FIG. 2. Each spline tooth 32 fits into a spline groove 11 formed in an inner surface of the case 10. The spline groove 11 also has a rectangular cross-section, with parallel side surfaces. There is a slight clearance between the side surfaces of each spline tooth 32 and the side surfaces of the spline groove 11. In this state, the gear member 3 is guided to the case 10, and is slidably movable along an axis of the gear member 3.

Gear grooves 31, each having a rectangular cross-section, are formed in the inner circumference of the gear member 3. The gear grooves 31 engage the outer gear teeth 51 of the ring gear $R_3$. The outer gear teeth 51, each having a rectangular cross-section, protrude from the outer surface of the ring gear $R_3$ in a radial direction. Gear groove 31 of gear member 3 and gear teeth 51 of ring gear $R_3$ are engaged with each other. A slight clearance separates the side surfaces of the grooves 31 and the teeth 51. This separation enables the center axis adjusting function of the ring gear $R_3$ during the torque transmission through the engagement of the ring gear $R_3$ and pinion gear $P_3$. Moreover, cutaway 51a and 31a are formed at the top corners of the outer gear teeth 51 and the opening corner of the gear groove 31, respectively, to facilitate the engagement of the gear grooves 31 and gear teeth 51.

Hydraulic servo 4 includes a hydraulic cylinder 40 formed in a narrowed portion of the case 10. An annular piston 41, having a J-shaped cross-section, is made of pressing material. The annular piston 41 is disposed in the hydraulic cylinder 40 and is slidable along the axis of the cylinder. A plurality of return springs 42 are disposed at uniform intervals along the circumference of the cylinder 40. The return springs 42 are compression coil springs for providing a return force to the gear member 3. One end of each return spring 42 is snapped onto the case 10 through spring sheet 43, and the other end is inserted into a positioning hole formed in the gear member 3. Thus, the return springs 42 are retained by the gear member 3.

Gear member 3 and piston 41 are formed as separate units. An end surface of the gear member 3 contacts a tip of the piston 41. Thus, the swing of the center axis of gear member 3 is consistent with the swing of the center axis of the piston 41. The position of the center axis of the piston 41 is adjusted by the elasticity of a sealing member 41a. The sealing member 41a is attached to the piston 41 by a baking process. This baking process enhances the durability of the sealing member when it is subjected to the biased load on the sealing member 41a.

The piston 41 is pushed out of the cylinder 40 when the oil pressure is supplied to the cylinder 40 of the hydraulic servo 4. The gear member 3, which contacts the tip of the piston 41, slides in the axial direction, and compresses the return spring 42. The gear grooves 31 mesh with the gear teeth 51 when the gear grooves 31 reach a position of gear engagement with the outer gear teeth 51. This meshing is accomplished very smoothly, even if a slight amount of positional shift occurs, since the gear grooves 31 and gear teeth 51 are guided to their proper positions by the cutaways 51a and 31a, formed at the corner of gear teeth 51 and gear grooves 31. Stable engagement is achieved when the gear member 3 is pushed further. In the stable engagement, a clearance separates the side face of gear tooth 51 and the side face of gear groove 31. This clearance allows the ring gear $R_3$, which is prevented from rotating because of the gear engagement, to align its center axis to the optimum position for engagement with pinion gear $P_3$.

In accordance the first embodiment of the invention, the transmission mechanism M is formed so that the rotation of the ring gear $R_3$ is stopped by engagement only upon achieving the reverse gear mode. In a conventional mechanism, ring gear $R_3$ is used to achieve both the reverse mode and a specific forward mode, which requires the rotational element to be meshed even in the torque-transmitted state. However, the invention obviates the engagement of the rotational element in the torque-transmitted state. Ring gear $R_3$ is fixed against the case 10 directly, through gear engagement with the brake mechanism, without using another frictional gear element, such as a multiple-disc clutch.

Thus, a simple gear brake structure is used to achieve the reverse mode. This simple structure prevents the apparatus from becoming large. Moreover, when the gear mode is changed from the reverse mode to other modes in which ring gear $R_3$ rotates, dragging, which occurs in the conventional mechanism upon releasing the reverse brake B-R, is basically eliminated. As a result, driving loss caused by the dragging of the rotational element, especially when the gear mode is changed frequently to the forward mode, can be greatly reduced. Other advantages of the invention are described above.

Figure 6:
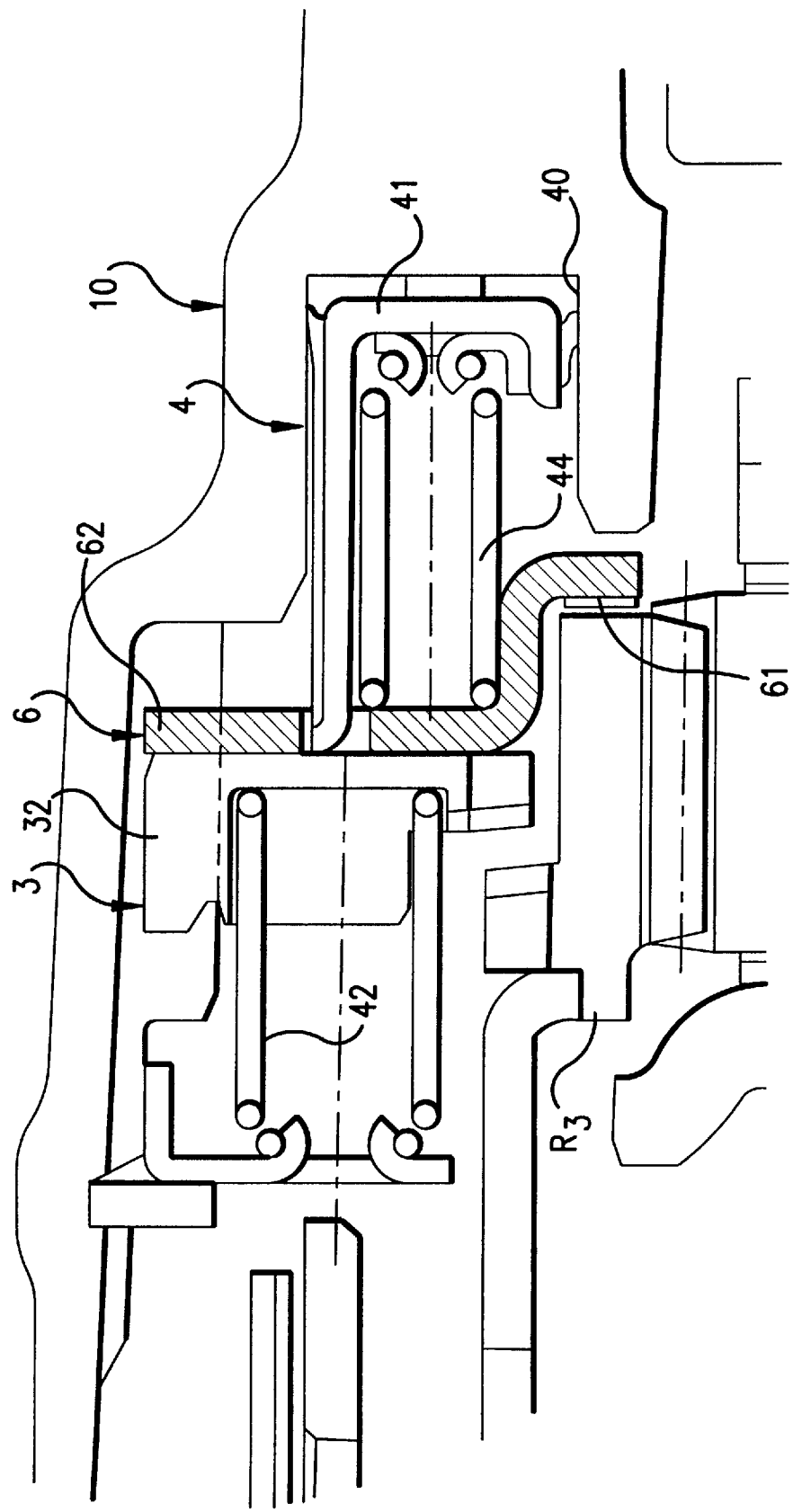
FIG. 6 is a partial cross-sectional view of a gear brake according to a second embodiment of the invention.

FIG. 6 shows a second embodiment of the invention. The frictional engagement member 6 is parallel to the gear member 3. The frictional engagement member 6 is retained on the case 10 so that it cannot rotate, but is movable in the axial direction. The frictional engagement member 6 frictionally engages a predetermined rotational element, i.e., ring gear $R_3$. The frictional engagement member 6 is disposed between the ring gear $R_3$ and case 10, parallel to the gear member 3. The frictional engagement member 6 moves in conjunction with the movement of the gear member 3, and fixes the ring gear $R_3$ against the case 10 by frictional engagement.

The frictional engagement member 6 and piston 41 of hydraulic servo 4 are formed separately. The frictional engagement member 6 has an engaging part 61 for frictionally engaging the ring gear $R_3$, and a coupling part 62 retained on the case 10 to prevent the frictional engagement member 6 from rotating. However, the frictional engagement member 6 is movable in the axial direction while allowing for slight swing of the center axis. The engaging part 61 has a frictional surface for contacting the ring gear $R_3$.

Hydraulic servo 4 is disposed between the frictional engagement member 6 and piston 41. Hydraulic servo 4 has a load transmissive spring 44 having a bias smaller than that of the return spring 42. The gear member 3 contacts the piston 41 due to the pressing force of the return spring 42. The frictional engagement member 6 contacts the gear member 3 by virtue of the pressing force of the load transmissive spring 44. Accordingly, the frictional engagement member 6 receives the pressing force generated by the action of the piston 41 via the load transmissive spring 44. Thus, the frictional engagement member 6 starts moving toward the frictional engaging position prior to when the gear member 3 meshes with the ring gear $R_3$. Then, when the piston 41 is pushed further, gear member 3 moves into the gear engaging position and is meshed with the ring gear $R_3$.

Figure 7:
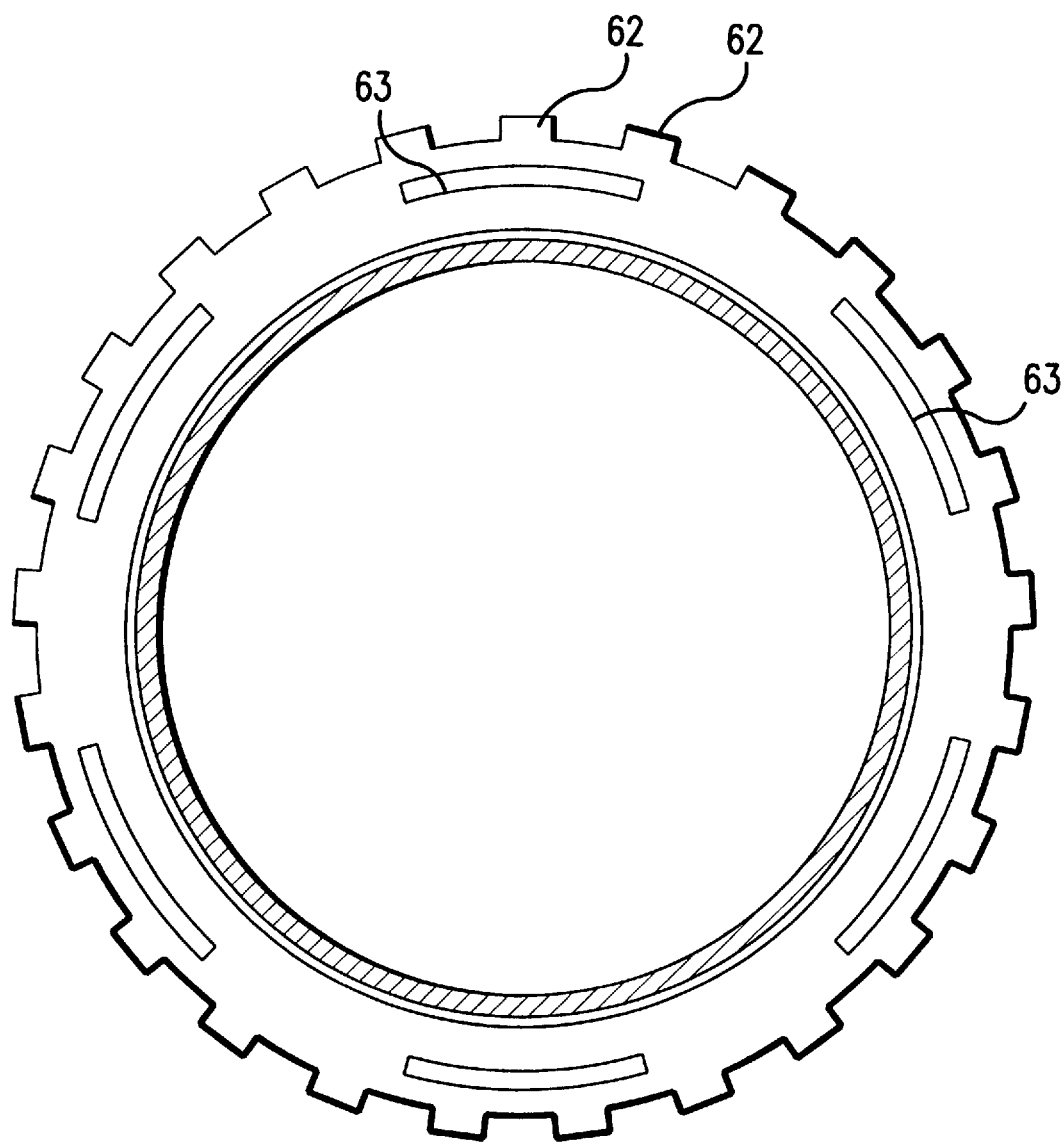
FIG. 7 is a front view of a frictional engagement member according to the second embodiment of the invention.

FIG. 7 is a front view of the frictional engagement member 6 in accordance with the second embodiment of the invention. The coupling part 62 formed along the outer circumference of the frictional engagement member 6 forms spline teeth. Similar to the spline teeth 32 of the gear member 3, each spline tooth of the frictional engagement member 6 has a rectangular cross-section. A plurality of windows 63 are defined in the frictional engagement member 6 at regular intervals along the circumference. The projections that extend from the end of the piston 41, like comb teeth, contact the side face of the gear member 3, via the windows 63 of the frictional engagement member 6. The engaging part 61, which corresponds to the inner circumference of the frictional engagement member 6, is provided with an appropriate frictional material to form a frictional surface. The frictional surface faces the side surface of the ring gear $R_3$.

Piston 41 is pushed out of the cylinder 40 when oil under pressure is supplied to the cylinder 40 of the hydraulic servo 4. The gear member 3, which contacts with the tip of the piston 41, slides in the axial direction, while compressing the return spring 42. The frictional engagement member 6 also moves under the pressing force of the load transmissive spring 44 until the frictional surface of the engaging part 61 contacts the side surface of the ring gear $R_3$. The rotation of the ring gear $R_3$ stops. However, the piston 41 continues moving. The gear member 3 advances further, leaving the frictional engagement member 6 at the engaging position. The rest of the operation of this apparatus is the same as that of the first embodiment.

In accordance with the second embodiment of the invention, the rotation of the ring gear $R_3$ is stopped immediately, even if it is still in rotation due to the slight dragging between the rotational elements. The rotation of ring gear $R_3$ is stopped by engaging the frictional engagement member 6, thereby preventing noise during the engagement. Moreover, the ring gear $R_3$ is fixed to the case 10 through both the engagement with the gear member 3 and the engagement with the frictional engagement member 6, in parallel. Thus, the gear member 3 can transmit a large amount of application torque to achieve the reverse gear mode, while allowing the engaging part of the frictional engagement member 6 to be made small. In addition to the advantages of the first embodiment, gear noise, due to the dragging, potentially caused by the dog clutch type brake structure, can be prevented, while suppressing the size of the apparatus as much as possible.

Figures 8, 9:
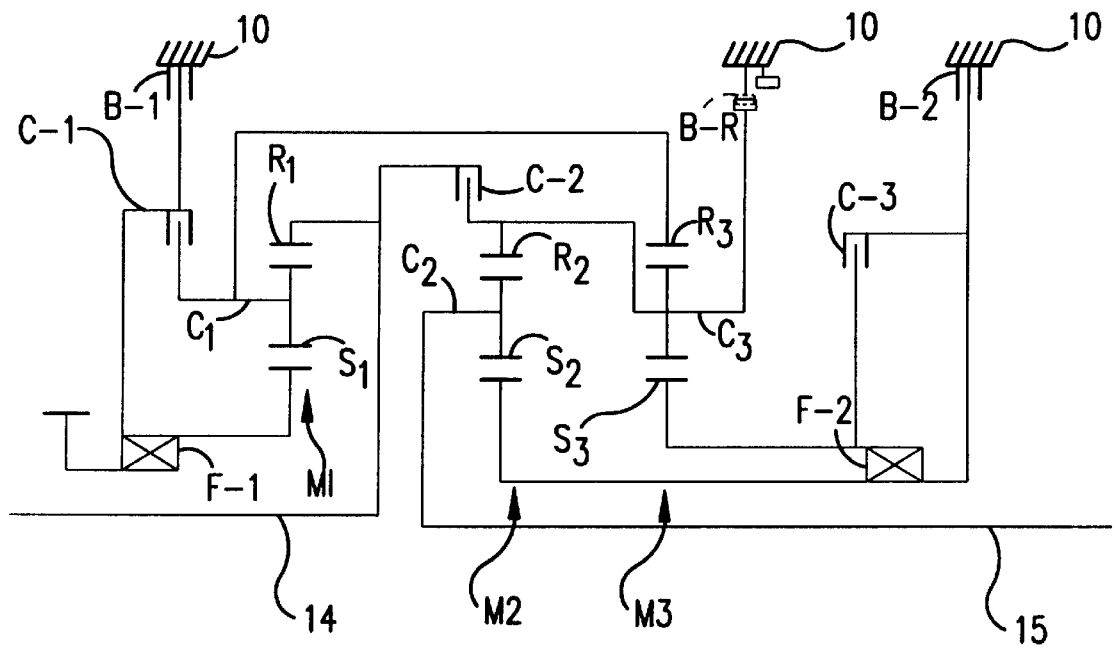
FIG. 8 is a diagram showing a modification of the transmission mechanism in accordance with the invention.
FIG. 9 is able showing the states of engagement and disengagements of the clutches and brakes of the transmission mechanism in accordance with the invention.

FIG. 8 shows a modification of the transmission mechanism, i.e., power train. The transmission mechanism includes three planetary gear sets, three clutches and three brakes, which are associated with the rotational elements of the planetary gear sets used for changing the gear mode, and two one-way clutches. In this train, carrier $C_1$ of the first planetary gear set M1 is coupled with ring gear $R_3$ of the third planetary gear set. Carrier $C_3$ of the third planetary gear set M3 is coupled with ring gear $R_2$ of the second planetary gear set M2. Input shaft 14 is coupled with ring gear $R_1$, and is also coupled with ring gear $R_2$, through the second clutch (C-2). Carrier $C_2$ is coupled with the output shaft.

Carrier $C_1$ can be fixed to the case, in the engaging manner, through the first brake B-1. Carrier $C_3$ and the associated ring gear $R_2$ can be fixed to the case in the engaging manner, through reverse brake B-R. Sun gear $S_2$ and sun gear $S_3$ are engaged and disengaged by clutch C-3. Sun gear $S_2$ can also be fixed to the case in the engaging manner, through brake B-2. In FIG. 8, F-1 and F-2 are one-way clutches.

FIG. 9 is a table showing the states of engagement of the clutch and brake elements of the transmission mechanism. As can be seen the table, the first speed mode (1ST) is achieved by engaging the clutch C-3, brake B-1, and brake B-2. In this state, all of the sun gears $S_1$, $S_2$, and $S_3$ are fixed to the case 10. An input through the input shaft 14 to ring gear $R_1$ is transmitted to the ring gear $R_3$, as the rotation of carrier $C_1$ having the inverse force of sun gear $S_1$. At the same time, the rotation of carrier $C_3$, having the inverse force of sun gear $S_3$, is transmitted to the ring gear $R_2$, and the rotation of carrier $C_2$ having the inverse force of sun gear $S_2$ is transmitted. Thus, an output containing the total of three stages of deceleration is output to the output shaft 15.

The second speed mode (2ND) is achieved by engaging clutches C-1, C-3, and brake B-2. In this state, the gears in planetary gear set M1 rotate in a body because of the engagement of clutch C-1. The rotation of the input shaft 14, i.e., the rotation of carrier $C_1$ of planetary gear set M1 rotating in a body, includes two stages of deceleration. The decelerated rotational force is output to the output shaft 15. More particularly, sun gears $S_2$ and $S_3$ are fixed by the engagement of clutch C-3 and brake B-2. The rotation of carrier $C_3$ in response to the rotation of ring gear $R_3$ receives the inverse force of sun gear $S_3$. The rotation of carrier $C_2$ in response to the rotation of ring gear $R_2$ receives the inverse force of sun gear $S_3$.

The third speed mode (3RD) is achieved by engaging clutches C-1 and C-2 and brake B-R. In this state, the rotation, i.e., input, transmitted to the ring gear $R_2$ of planetary gear set M2 is output as an output from the carrier $C_2$, receiving the inverse force of the fixed sun gear $S_2$. This results in one stage of deceleration.

The fourth speed mode (4TH) is achieved by engaging all of the clutches C-1 –C-3. In this state, the gears included in the planetary gear sets M1, M2 and M3 rotate in a body. The input from the input shaft 14 to ring gear $R_2$ through clutch C-2 is output without any deceleration.

The fifth speed mode (5TH) is achieved by engaging clutches C-2 and C-3 and brake B-1. In this state, ring gear $R_2$ of planetary gear set M2 rotates at the same speed as the input shaft 14, because of the engagement of clutch C-2. Whereas, sun gear $S_2$ rotates at the same speed as the increased rotational speed of sun gear $S_3$. The increased rotational speed of sun gear $S_3$ is the sum of the rotation of ring gear $R_3$ of planetary gear set M3 decelerated through planetary gear set M2, and the rotation of carrier $C_3$ rotating at the same speed as the rotation of the input shaft through clutch C-2. Thus, the increased rotation of sun gear $S_3$ is transmitted to sun gear $S_2$ through clutch C-3. In this structure, over-drive rotation, which is faster than the rotation of the input shaft, is output to the carrier $C_2$.

In the reverse mode (REV), ring gear $R_1$ operates as an input element. The rotation of carrier $C_1$ of planetary gear set M1, which receives the inverse force reaction of the sun gear $S_1$ that is fixed because of the engagement of brake B-R, is input to ring gear $R_3$. This input is transmitted to sun gear $S_2$, through clutch C-3, as the reverse rotation of sun gear $S_3$ with carrier $C_3$ that is fixed because of the engagement of break B-R. The rotation is output to carrier $C_2$, including the inverse force, i.e., reaction of ring gear $R_2$ that is fixed because of the engagement of break B-R. This is the reverse 1st mode (REV1).

If clutch C-1 is also brought into the engaging position, planetary gear set M1 rotates in a body. The rotational speed of carrier $C_1$ is maintained the same as that of the input shaft, without deceleration. This is the reverse 2nd mode REV2.

In this transmission mechanism, brake B-R is used for the reverse mode exclusively. The same effect and advantages can be obtained by designing brake B-R as a gear brake.

Figure 10:
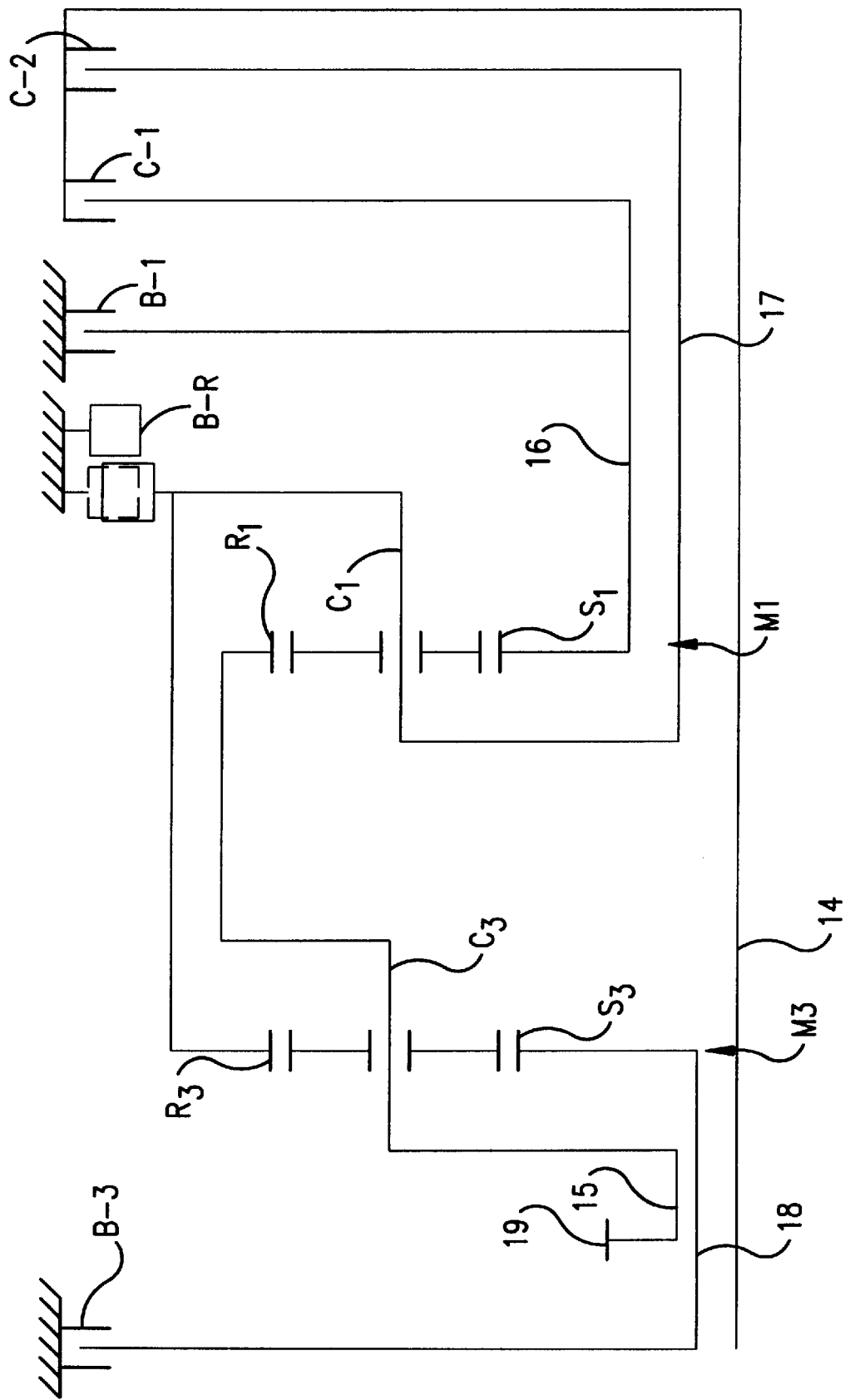
FIG. 10 is a diagram showing another modification of the transmission mechanism in accordance with the invention.

FIG. 10 shows another modification of the transmission mechanism. This transmission mechanism is the same as the gear train of the first embodiment, except that the second planetary gear set M2, and brake B-2 that controls the second planetary gear set M2, are removed. Thus, the over-drive mode is removed. Forward four speed mode transmission is achieved with a simplified structure.

There is another slight difference in this modification. Input clutches C-1 and C-2 are positioned on one side of the transmission mechanism. However, there is no essential difference regarding the dragging of the rotational element, which is the subject of the invention.

In this modification, the over-drive mode, i.e., the fifth speed mode (5TH), and the corresponding brake B-2, are removed. The remainder of the structure and operations of the transmission mechanism is the same as that of the first embodiment. The same reference numbers are assigned to the same elements. The table shown in FIG. 5 and the corresponding description can also apply to this modification.

In this transmission mechanism, brake B-R is used exclusively for the reverse mode. The same effect and advantages can be obtained by designing brake B-R as a gear brake.

Although the invention has been described in conjunction with the two preferred embodiments having different gear brake structures, and three transmission mechanisms which are the applications of these brake structures, the invention is not limited to these applications, but is applicable to various transmission mechanisms. Furthermore, various changes and substitutions are possible in the structure of the brake mechanism itself, without departing from the scope of the invention defined by the appended claims.

What is claimed is:

1. An automatic transmission for a vehicle with a reverse gear brake, comprising:

a case;

a predetermined rotational element having gear teeth and an axis, and disposed within the case, the predetermined rotational element is stopped only when not achieving a reverse gear mode; and a brake having a gear member, the gear member attached to the case so that it cannot rotate relative to the case, but is movable along the axis of the predetermined rotational element so that it can be engaged and disengaged with the gear teeth of the predetermined rotational element;

wherein the predetermined rotational element is fixed to the case so that it cannot rotate relative to the case when the gear teeth engage the gear member.

2. The automatic transmission according to claim 1, wherein the brake includes a hydraulic servo that has a piston for moving the gear member into a position where it engages the gear teeth of the predetermined rotational element, and a return spring disposed to move the gear member away from the position where it engages the gear teeth of the predetermined rotational element.

3. The automatic transmission according to claim 2, wherein the gear member is formed separately from the piston of the hydraulic servo, the gear member has teeth that are engagable with the gear teeth of the predetermined rotational element, the gear member also has a coupling part attached to the case so that it cannot rotate relative to the case but is movable along the axis of the predetermined rotational element while providing for movement at an angle to the axis when the teeth of the gear member engage the gear teeth of the predetermined rotational element, whereby the gear member moves in response to the movement of the piston of the hydraulic servo against a force of the return spring.

4. The automatic transmission according to claim 3, wherein first gear grooves separate the gear teeth of the predetermined rotational element, second gear grooves separate the teeth of the gear member, the gear teeth of the predetermined rotational element engage the second gear grooves of the gear member, and each of the first and second gear grooves has a rectangular cross-section and parallel side faces.

5. The automatic transmission according to claim 1, wherein the brake includes a frictional engagement member attached to the case so that it cannot rotate relative to the case, but is movable along the axis of the predetermined rotational element to frictionally contact the predetermined rotational element.

6. The automatic transmission according to claim 5, wherein the frictional engagement member is disposed between the predetermined rotational element and the case and extends parallel to the gear member, the frictional engagement member moves with the gear member to fix the predetermined rotational element to the case by frictional engagement with the predetermined rotational element.

7. The automatic transmission according to claim 6, wherein the brake includes a hydraulic servo that has a piston for moving the frictional engagement member into frictional engagement with the predetermined rotational element and the gear member into gear engagement with the predetermined rotational element, and a return spring for moving the gear member out of gear engagement with the predetermined rotational element.

8. The automatic transmission according to claim 7, wherein the gear member is formed separately from the piston of the hydraulic servo, the gear member has teeth that are engagable with the gear teeth of the predetermined rotational element, the gear member also has a coupling part attached to the case so that it cannot rotate relative to the case but is movable along the axis of the predetermined rotational element while providing for movement at an angle to the axis when the teeth of the gear member engage the gear teeth of the predetermined rotational element.

9. The automatic transmission according to claim 8, wherein the frictional engagement member is formed separately from the piston of the hydraulic servo, the frictional engagement member has an engaging part that is frictionally engagable with the predetermined rotational element, the frictional engagement member also has a coupling part attached to the case so that it cannot rotate relative to the case but is movable along the axis of the predetermined rotational element while providing for movement at an angle to the axis when the teeth of the gear member engage the gear teeth of the predetermined rotational element, whereby the frictional engagement member moves in response to the movement of the piston of the hydraulic servo against a force of the return spring.

10. The automatic transmission according to claim 9, wherein first gear grooves separate the gear teeth of the predetermined rotational element, second gear grooves separate the teeth of the gear member, the gear teeth of the predetermined rotational element engage the second gear grooves of the gear member, and each of the first and second gear grooves has a rectangular cross-section and parallel side faces.

11. The automatic transmission according to claim 10, wherein the frictional engagement member frictionally engages the predetermined rotational element prior to gear engagement of the gear member and the predetermined rotational element.

12. The automatic transmission according to claim 11, wherein the frictional engagement member has a frictional surface for frictionally engaging the predetermined rotational element.

13. The automatic transmission according to claim 12, wherein the hydraulic servo has a load transmissive spring disposed between the frictional engagement member and the piston.

14. The automatic transmission according to claim 13, wherein the return spring forces the gear member into contact with the piston, and the load transmissive spring forces the gear member into contact with the frictional engagement member.

15. The automatic transmission according to claim 14, wherein movement of the piston causes the frictional engagement member to be pressed into frictional engagement with the predetermined rotational element via the load transmissive spring, and further movement of the piston causes the gear member to move into gear engagement with the predetermined rotational element.

* * * * *